United States Patent
Niwa et al.

(10) Patent No.: US 9,429,646 B2
(45) Date of Patent: Aug. 30, 2016

(54) RECEIVING CIRCUIT, SEMICONDUCTOR DEVICE, AND SENSOR DEVICE

(75) Inventors: Isao Niwa, Kyoto (JP); Youichiro Noguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 365 days.

(21) Appl. No.: 14/342,578

(22) PCT Filed: Aug. 31, 2012

(86) PCT No.: PCT/JP2012/072186
§ 371 (c)(1),
(2), (4) Date: Mar. 4, 2014

(87) PCT Pub. No.: WO2013/035643
PCT Pub. Date: Mar. 14, 2013

(65) Prior Publication Data
US 2014/0225477 A1    Aug. 14, 2014

(30) Foreign Application Priority Data

Sep. 7, 2011 (JP) ................................. 2011-195304
May 17, 2012 (JP) ................................. 2012-113181

(51) Int. Cl.
| | |
|---|---|
| H01L 41/113 | (2006.01) |
| H01L 41/09 | (2006.01) |
| G01S 7/526 | (2006.01) |
| G01F 1/66 | (2006.01) |
| G01S 7/523 | (2006.01) |
| G01S 15/93 | (2006.01) |
| G01S 7/52 | (2006.01) |

(52) U.S. Cl.
CPC ............... *G01S 7/526* (2013.01); *G01F 1/667* (2013.01); *G01S 7/523* (2013.01); *G01S 7/52017* (2013.01); *G01S 15/931* (2013.01)

(58) Field of Classification Search
CPC ............. H01L 41/042; H01L 41/1132; H01L 41/107; H02N 2/181; G01L 1/16
USPC .................................................. 310/317–319
See application file for complete search history.

(56) References Cited

U.S. PATENT DOCUMENTS

| | | | |
|---|---|---|---|
| 6,249,111 | B1 | 6/2001 | Nguyen |
| 2003/0200817 | A1 | 10/2003 | Suginouchi et al. |

(Continued)

FOREIGN PATENT DOCUMENTS

| | | |
|---|---|---|
| CN | 1436393 A | 8/2003 |
| CN | 1455230 A | 11/2003 |

(Continued)

OTHER PUBLICATIONS

Japanese Patent Office, International Search Report for International Patent Application PCT/JP2012/072186 (Oct. 2, 2012).

(Continued)

*Primary Examiner* — Thomas Dougherty
(74) *Attorney, Agent, or Firm* — Fish & Richardson P.C.

(57) ABSTRACT

A receiving circuit (10) includes an amplifier (15) which amplifies receiving signals (SP, SN) of a piezoelectric sensor (2), and a plurality of transistors (11a, 11b) or (12a, 12b), which are connected in parallel to between one end of the piezoelectric sensor (2) and one end of the amplifier (15), and are turned on with phase shift when switching is performed to receiving operations.

20 Claims, 15 Drawing Sheets

(56) References Cited

U.S. PATENT DOCUMENTS

| | | |
|---|---|---|
| 2005/0061085 A1 | 3/2005 | Jespersen |
| 2006/0077272 A1 | 4/2006 | Yamada et al. |
| 2009/0168603 A1 | 7/2009 | Okuda et al. |
| 2010/0124086 A1 | 5/2010 | Chen |
| 2011/0261651 A1 | 10/2011 | Okuda et al. |

FOREIGN PATENT DOCUMENTS

| | | | |
|---|---|---|---|
| CN | 101692596 A | 4/2010 | |
| JP | 2001-318139 | 11/2001 | |
| JP | 2005-532531 | 10/2005 | |
| JP | 2008-014841 | 1/2008 | |
| JP | 2009-175119 | 8/2009 | |
| WO | 98/00685 | 1/1998 | |
| WO | WO-9800685 * | 1/1998 | ............. A61M 1/36 |

OTHER PUBLICATIONS

European Search Report in patent application No. 12830113.2 (mailed on Jun. 3, 2015).

* cited by examiner

RECEIVING CIRCUIT, SEMICONDUCTOR DEVICE, AND SENSOR DEVICE

TECHNICAL FIELD

The present invention relates to a receiving circuit to which a reception signal is input from a piezoelectric sensor, a semiconductor device in which the receiving circuit is integrated, and a sensor device using the semiconductor device.

BACKGROUND ART

FIG. 14 is a diagram illustrating a conventional example of a sensor device for sending and receiving ultrasonic waves. A sensor device 200 of this conventional example includes a piezoelectric sensor 210, a transmission circuit 220, and a receiving circuit 230. The receiving circuit 230 includes a differential amplifier 231, and transistors 232 and 233.

The transistors 232 and 233 work as switches for connecting/disconnecting between the piezoelectric sensor 210 and the differential amplifier 231 in accordance with a control signal SW. More specifically, the transistors 232 and 233 are turned off in transmission operation of ultrasonic waves and are turned on in reception operation of ultrasonic waves.

As an example of the conventional technique related to the above description, there is Patent Document 1.

PRIOR ART DOCUMENTS

Patent Documents

Patent Document 1: JP-A-2009-175119

DISCLOSURE OF THE INVENTION

Problem to be Solved by the Invention

Here, in the sensor device 200 having the above-mentioned conventional structure, when turning on the transistors 232 and 233 in the reception operation of ultrasonic waves, a part of the control signal SW applied to gates of the transistors 232 and 233 is transmitted to an input/output terminal of the piezoelectric sensor 210 through each gate-drain capacitance coupling. As a result, a terminal voltage of the piezoelectric sensor 210 fluctuates, and hence noise having a resonance period T of the piezoelectric sensor 210 is generated in reception signals SP and SN of the piezoelectric sensor 210 (see FIG. 15).

Note that it is possible to suppress the noise by reducing element sizes of the transistors 232 and 233 so that each gate-drain capacitance coupling can be reduced. However, if this countermeasure is adopted, impedances (on-resistances) of the transistors 232 and 233 are increased as the trade-off. As a result, attenuations of the reception signals SP and SN in reception operation of the ultrasonic wave are increased, and hence characteristics required to the sensor device 200 may not be satisfied.

In addition, in a case where the receiving circuit 230 includes the differential amplifier 231, if a positive phase noise superimposed on the reception signal SP is completely the same phase as a reverse phase noise superimposed on the reception signal SN, both the noises can be canceled by each other. However, it is not secured that the positive phase noise and the reverse phase noise are completely the same phase.

If phases of the both noises are shifted from each other, there is remaining noise not only in the reception signals SP and SN input to the differential amplifier 231 but also in a differential amplified signal SR output from the differential amplifier 231. Therefore, in order to detect the ultrasonic wave with high accuracy, it is necessary to wait for the reception operation of the ultrasonic wave until the noise is sufficiently attenuated.

In view of the above-mentioned problem found by the inventor, it is an object of the present invention to provide a receiving circuit capable of suppressing noise generated in switching to the reception operation, a semiconductor device in which the receiving circuit is integrated, and a sensor device using the semiconductor device.

Means for Solving the Problem

In order to achieve the above-mentioned object, a receiving circuit according to the present invention includes an amplifier for amplifying a reception signal of a piezoelectric sensor, and a plurality of transistors connected in parallel between one end of the piezoelectric sensor and one end of the amplifier. The transistors are turned on with phase shift in switching to a reception operation (first structure).

Further, in the receiving circuit having the first structure, it is preferred that the plurality of transistors are 2n transistors obtained by dividing a single transistor having desired impedance characteristics into ½n (n is a natural number) (second structure).

In addition, in the receiving circuit having the second structure, it is preferred that the 2n transistors are turned on with phases shifted by T/2n each (T is a resonance period of the piezoelectric sensor) in switching to the reception operation (third structure).

In addition, it is preferred that the receiving circuit having any one of the first to third structures further includes a filter for blunting a control signal of each transistor (fourth structure).

In addition, in the receiving circuit having any one of the first to fourth structures, it is preferred that the reception signal is transmitted between the piezoelectric sensor and the amplifier in a differential form (fifth structure).

In addition, it is preferred that the receiving circuit having the fifth structure further includes a switch for short-circuiting a positive phase transmission path and a reverse phase transmission path of the reception signal in switching to the reception operation (sixth structure).

In addition, a receiving circuit according to the present invention includes an amplifier for differentially amplifying a reception signal of a piezoelectric sensor, a first transistor for connecting between the piezoelectric sensor and the amplifier in switching to a reception operation, and a second transistor for short-circuiting a positive phase transmission path and a reverse phase transmission path of the reception signal in switching to the reception operation (seventh structure).

In addition, a receiving circuit according to the present invention includes an amplifier for amplifying a reception signal of the piezoelectric sensor, a main transistor connected between one end of the piezoelectric sensor and one end of the amplifier, which is turned on in switching to a reception operation, and a sub transistor connected in parallel to the main transistor, which has a larger on-impedance than the main transistor and is turned on prior to the main transistor in switching to the reception operation (eighth structure).

Further, in the receiving circuit having the eighth structure, it is preferred that the main transistor is divided into 2n transistors to be turned on with phases shifted by T/2n each (T is a resonance period of the piezoelectric sensor, and n is a natural number) in switching to the reception operation (ninth structure).

In addition, it is preferred that the receiving circuit having the eighth or ninth structure further include a filter for blunting control signals of the main transistor and the sub transistor (tenth structure).

In addition, in the receiving circuit having any one of the eighth to tenth structures, it is preferred that the reception signal is transmitted between the piezoelectric sensor and the amplifier in a differential form (eleventh structure).

In addition, it is preferred that the receiving circuit having the eleventh structure further includes a switch for short-circuiting a positive phase transmission path and a reverse phase transmission path of the reception signal in switching to the reception operation (twelfth structure).

In addition, a semiconductor device according to the present invention includes the receiving circuit according to any one of the first to twelfth structures, to which the reception signal is input from the piezoelectric sensor (thirteenth structure).

Further, it is preferred that the semiconductor device having the thirteenth structure further includes a transmission circuit configured to output a transmission signal to the piezoelectric sensor, and a control circuit configured to control the reception operation of the receiving circuit and the transmission operation of the transmission circuit in a time sharing manner (fourteenth structure).

In addition, in the semiconductor device having the fourteenth structure, it is preferred that the transmission circuit is disposed for each one of a plurality of piezoelectric sensors, and the receiving circuit is disposed solely for the plurality of piezoelectric sensors (fifteenth structure).

In addition, in the semiconductor device having the fifteenth structure, it is preferred that a plurality of signal paths respectively connecting between the receiving circuit and the plurality of piezoelectric sensors are designed to have the same length (sixteenth structure).

In addition, a sensor device according to the present invention includes a piezoelectric sensor and the semiconductor device according to any one of the thirteenth to sixteenth structures (seventeenth structure).

In addition, it is preferred that the sensor device having the seventeenth structure is a current meter for measuring flow speed of a fluid flowing in a pipe (eighteenth structure).

In addition, in the sensor device having the eighteenth structure, it is preferred that the piezoelectric sensor includes a first piezoelectric sensor and a second piezoelectric sensor disposed on an inner wall surface of the pipe in such a manner to be opposed to each other with a predetermined angle to the fluid (nineteenth structure).

Effects of the Invention

According to the present invention, it is possible to provide the receiving circuit capable of suppressing noise generated in switching to the reception operation, a semiconductor device in which the receiving circuit is integrated, and a sensor device using the semiconductor device.

BEST MODE FOR CARRYING OUT THE INVENTION

First Embodiment

Figure 1:
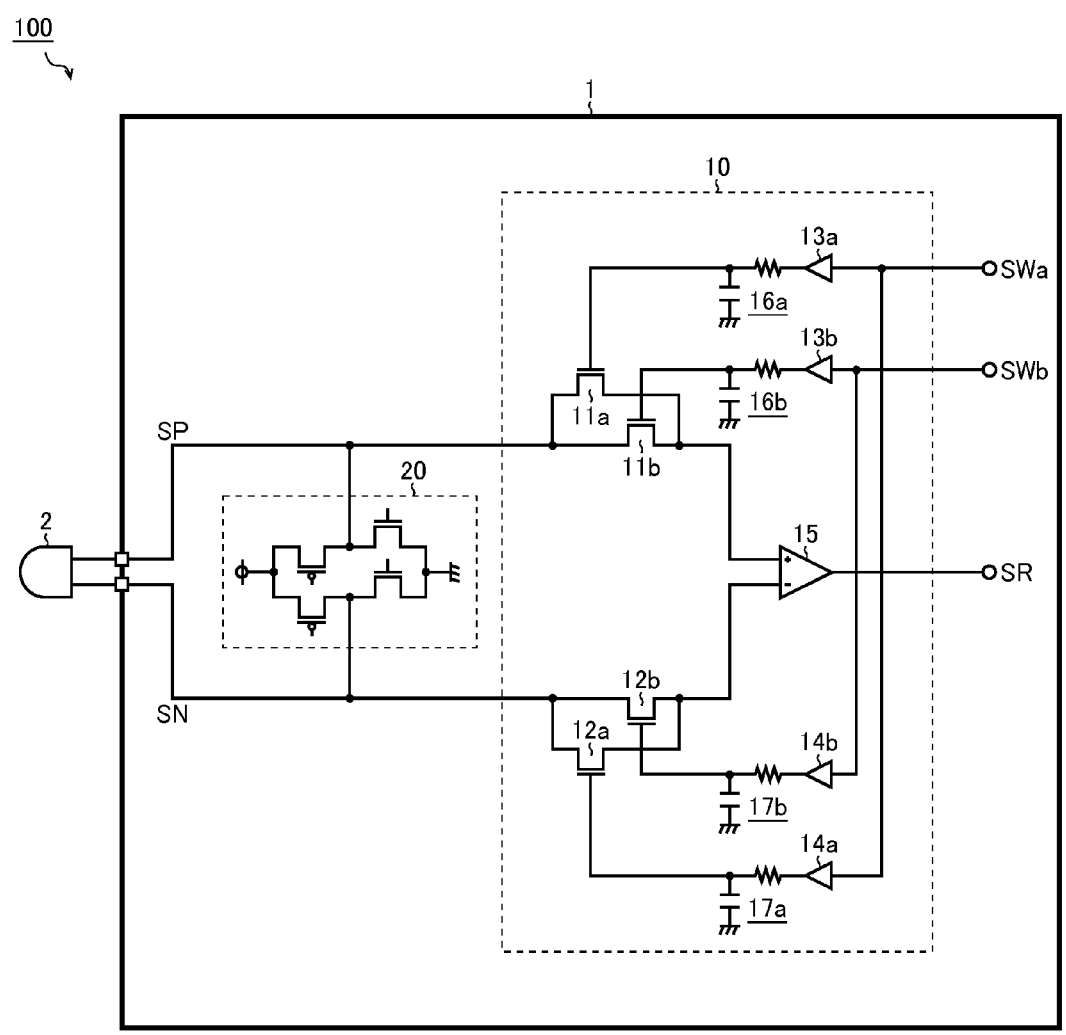
FIG. 1 is a diagram illustrating a first embodiment of a sensor device.

FIG. 1 is a diagram illustrating a first embodiment of a sensor device for sending and receiving ultrasonic waves. The sensor device 100 of the first embodiment includes a semiconductor device 1 and a piezoelectric sensor 2. The semiconductor device 1 sends and receives ultrasonic waves by using the piezoelectric sensor 2 connected to an outside thereof. The piezoelectric sensor 2 performs interconversion between an electric signal (electric energy) and an ultrasonic wave (oscillation energy) by using a piezoelectric element such as lead zirconate titanate (PZT).

A receiving circuit 10, a transmission circuit 20, and a control circuit 30 (not illustrated in FIG. 1) are integrated in the semiconductor device 1. The receiving circuit 10 receives reception signals SP and SN differentially input from the piezoelectric sensor 2 in a reception operation of an ultrasonic wave and transmits to the control circuit 30. The transmission circuit 20 differentially outputs a transmission signal (rectangular pulse) to the piezoelectric sensor 2 in a transmission operation of the ultrasonic wave. The control circuit 30 controls the reception operation of the receiving circuit 10 and the transmission operation of the transmission circuit 20 in a time sharing manner.

The receiving circuit 10 includes N-channel metal oxide semiconductor (MOS) field effect transistors 11a and 11b, N-channel MOS field effect transistors 12a and 12b, buffers 13a and 13b, buffers 14a and 14b, a differential amplifier 15, filters 16a and 16b, and filters 17a and 17b.

Figure 14:
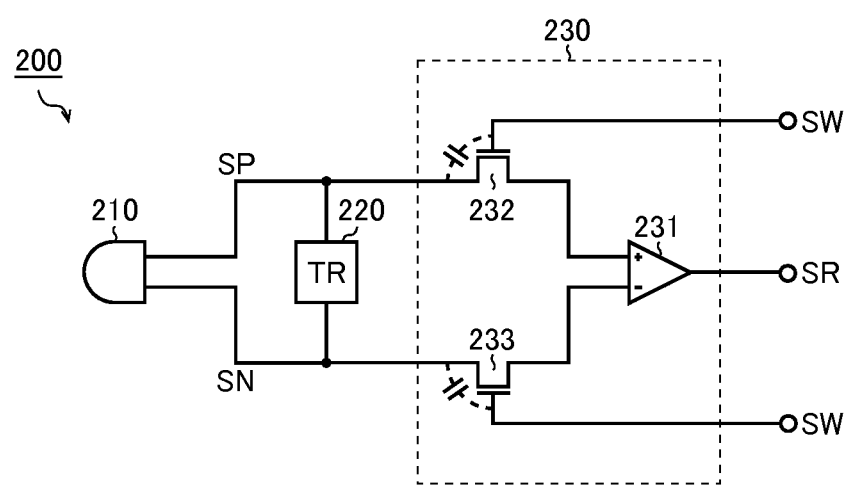
FIG. 14 is a diagram illustrating a conventional example of the sensor device.
Figure 15:
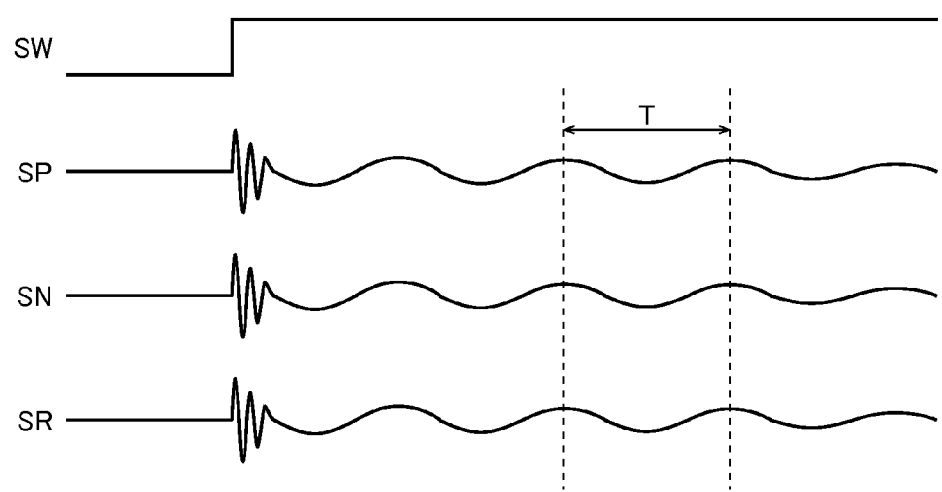
FIG. 15 is a time chart illustrating a state when a noise occurs.

Drains of the transistors 11a and 11b are both connected to a positive phase input/output terminal of the piezoelectric sensor 2. Sources of the transistors 11a and 11b are both connected to a positive phase input terminal of the differential amplifier 15. A gate of the transistor 11a is connected to an application terminal of a control signal SWa via the filter 16a and the buffer 13a. A gate of the transistor 11b is connected to an application terminal of a control signal SWb via the filter 16b and the buffer 13b. Note that an element size of the transistors 11a and 11b should be designed to be a half of an element size necessary for satisfying impedance characteristics required to the sensor device 100 when the transistors 11a and 11b are replaced with single transistor. In other words, the transistors 11a and 11b are connected in parallel between the positive phase input/output terminal of the piezoelectric sensor 2 and the positive phase input terminal of the differential amplifier 15, in such a manner that a single transistor (corresponding to a transistor 232 illustrated in FIG. 14) having a desired impedance characteristics is divided into a half element size.

Drains of the transistors 12a and 12b are both connected to a reverse phase input/output terminal of the piezoelectric sensor 2. Sources of the transistors 12a and 12b are both connected to a reverse phase input terminal of the differential amplifier 15. A gate of the transistor 12a is connected to the application terminal of the control signal SWa via the filter 17a and the buffer 14a. A gate of the transistor 12b is connected to the application terminal of the control signal SWb via the filter 17b and the buffer 14b. Note that an element size of the transistors 12a and 12b should be designed to be a half of an element size necessary for satisfying impedance characteristics required to the sensor device 100 when the transistors 12a and 12b are replaced with single transistor. In other words, the transistors 12a and 12b are connected in parallel between the reverse phase input/output terminal of the piezoelectric sensor 2 and the reverse phase input terminal of the differential amplifier 15, in such a manner that a single transistor (corresponding to a transistor 233 illustrated in FIG. 14) having a desired impedance characteristics is divided into a half.

The buffers 13a and 13b shape waveforms of the control signals SWa and SWb and transmit to the filters 16a and 16b, respectively.

The buffers 14a and 14b shape waveforms of the control signals SWa and SWb and transmit to the filters 17a and 17b, respectively.

The differential amplifier 15 differentially amplifies the reception signals SP and SN of the piezoelectric sensor 2 so as to generate the differential amplified signal SR, and sends out the differential amplified signal SR to the control circuit 30.

The filters 16a and 16b respectively blunt the control signals SWa and SWb so as to transmit to the gates of the transistors 11a and 11b. As the filters 16a and 16b, a CR low-pass filter including a resistor and a capacitor can be used, for example.

The filters 17a and 17b respectively blunt the control signals SWa and SWb so as to transmit to the gates of the transistors 12a and 12b. As the filters 17a and 17b, a CR low-pass filter including a resistor and a capacitor can be used, for example.

Figure 2:
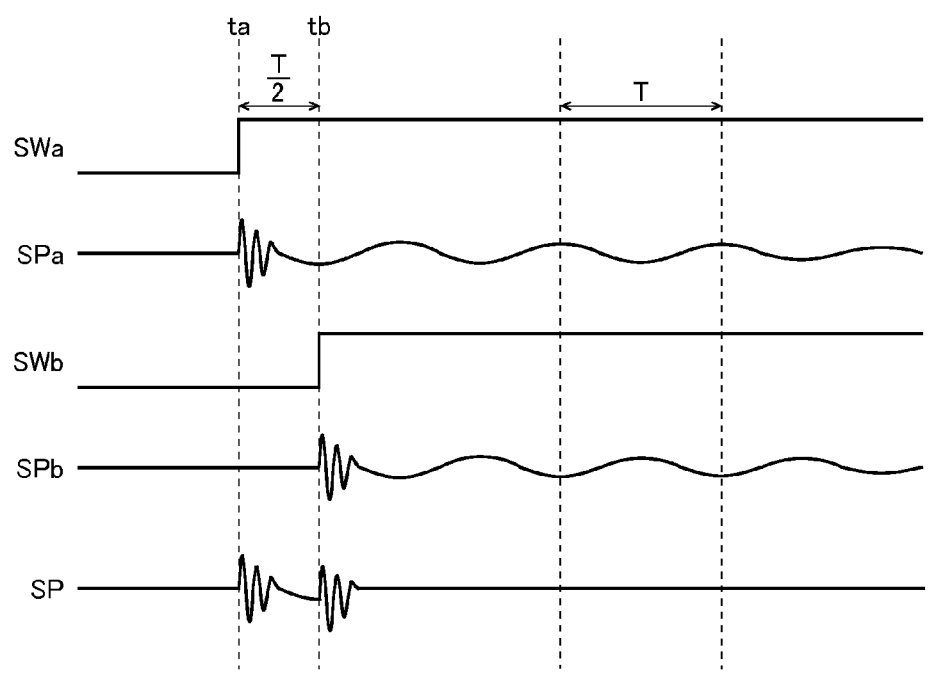
FIG. 2 is a time chart illustrating a noise removal operation of the first embodiment.

FIG. 2 is a time chart illustrating a noise removal operation of the first embodiment. In order from an upper side, there are illustrated the control signal SWa, a noise SPa (a virtual waveform in which only a noise component generated by turning on of the transistor 11a is extracted from the reception signal SP and illustrated), the control signal SWb, a noise SPb (a virtual waveform in which only a noise component generated by turning on of the transistor 11b is extracted from the reception signal SP and illustrated), and the reception signal SP (a combined waveform of the noises SPa and SPb).

Note that only the reception signal SP on the positive phase side is illustrated in FIG. 2, but the reception signal SN on the reverse phase side also shows the same behavior as the reception signal SP on the positive phase side except that the phase is reversed by 180 degrees. Therefore, in the following description concerning the first embodiment, the noise removal operation is described in which only the reception signal SP on the positive phase side is noted. However, the following description can be understood as description of the noise removal operation of the reception signal SN by reading "SP" as "SN", "SPa" as "SNa", "SPb" as "SNb" "11a" as "12a", "11b" s "12b", "16a" as "17a", "16b" s "17b", and "232" s "233".

When the control signal SWa is raised from low level to high level at a time point ta, the transistor 11a is turned on. Then, the noise SPa having the resonance period T of the piezoelectric sensor 2 is generated in the reception signal SP. However, the element size of the transistor 11a is reduced to a half of the single transistor 232 (see FIG. 14) disposed in the receiving circuit 200 of the conventional structure. Therefore, the noise SPa is controlled to be smaller than that the conventional structure. Note that at the time point ta, the control signal SWb is maintained to be low level, and the transistor 11b remains to be off. Therefore, the noise SPb is generated in the reception signal SP.

Next, when the control signal SWb is raised from low level to high level at a time point tb after T/2 from the time point ta, the transistor 11b is turned on. Then, the second noise SPb having the resonance period T of the piezoelectric sensor 2 if generated in the reception signal SP. However, similarly to the transistor 11a, an element size of the transistor 11b is also reduced to a half of the transistor 232 (see FIG. 14) of the conventional structure. Therefore, the noise SPb is controlled than that the conventional structure.

In addition, a T/2 phase shift is disposed between the on timing (time point ta) of the transistor 11a and the on timing (time point tb) of the transistor 11b. Therefore, the noise SPb generated due to turn-on operation of the transistor 11b has a waveform of opposite phase to the noise SPa generated due to turn-on operation of the transistor 11a. As a result, the noises SPa and SPb superimposed on the reception signal SP after the time point tb are canceled by each other.

Note that the transistors 11a and 11b are both maintained to be on-state after the time point tb until the reception operation of ultrasonic waves is completed. In other words, the transistors 11a and 11b work as a single transistor having desired impedance characteristics (corresponding to the transistor 232 illustrated in FIG. 14) after the time point tb.

As described above, in the receiving circuit 10 of the first embodiment, the transistors 11a and 11b connected in parallel between the positive phase input/output terminal of the piezoelectric sensor 2 and the positive phase input terminal of the differential amplifier 15 have an element size obtained by dividing the single transistor 232 (see FIG. 14) having desired impedance characteristics into a half, and are turned on with phases shifted by T/2 each when switching to the reception operation. With this structure, a noise due to the turn-on operation of the transistor can be dispersed or canceled without deteriorating impedance characteristics of the transistor for connecting/disconnecting between the piezoelectric sensor 2 and the differential amplifier 15. Therefore, it is possible to largely suppress the noise generated by switching to the reception operation so as to achieve shortening of reception wait time and improvement of detection accuracy of ultrasonic waves.

In addition, the receiving circuit 10 of the first embodiment further includes the filters 16a and 16b for blunting the control signals SWa and SWb. With this structure, generation itself of the noises SPa and SPb can be suppressed.

In addition, in the receiving circuit 10 of the first embodiment, the reception signals SP and SN are transmitted between the piezoelectric sensor 2 and the differential amplifier 15 in a differential form. With this structure, the noises remaining in the reception signals SP and SN are canceled in no small way by the differential amplification process in the differential amplifier 15. Therefore, the differential amplified signal SR with little noise can be transmitted to the control circuit 30.

Note that it is ideal to turn on the transistors 11a and 11b by shifting the phases by T/2 when switching to the reception operation. However, the on timings of the transistors 11a and 11b are not limited to this. It is possible to expect the noise reduction effect as long as both the transistors are not turned on simultaneously.

In addition, the number of the transistors connected in parallel is not limited to two. Three or more transistors may be connected. However, in order to appropriately cancel noises generated due to turn-on operation of the transistors, it is desired to connect in parallel 2n transistors obtained by dividing the single transistor having desired impedance characteristics into ½n (n is a natural number), and to turn on the transistors by shifting phases by T/2n each when switching to the reception operation.

Figure 3:
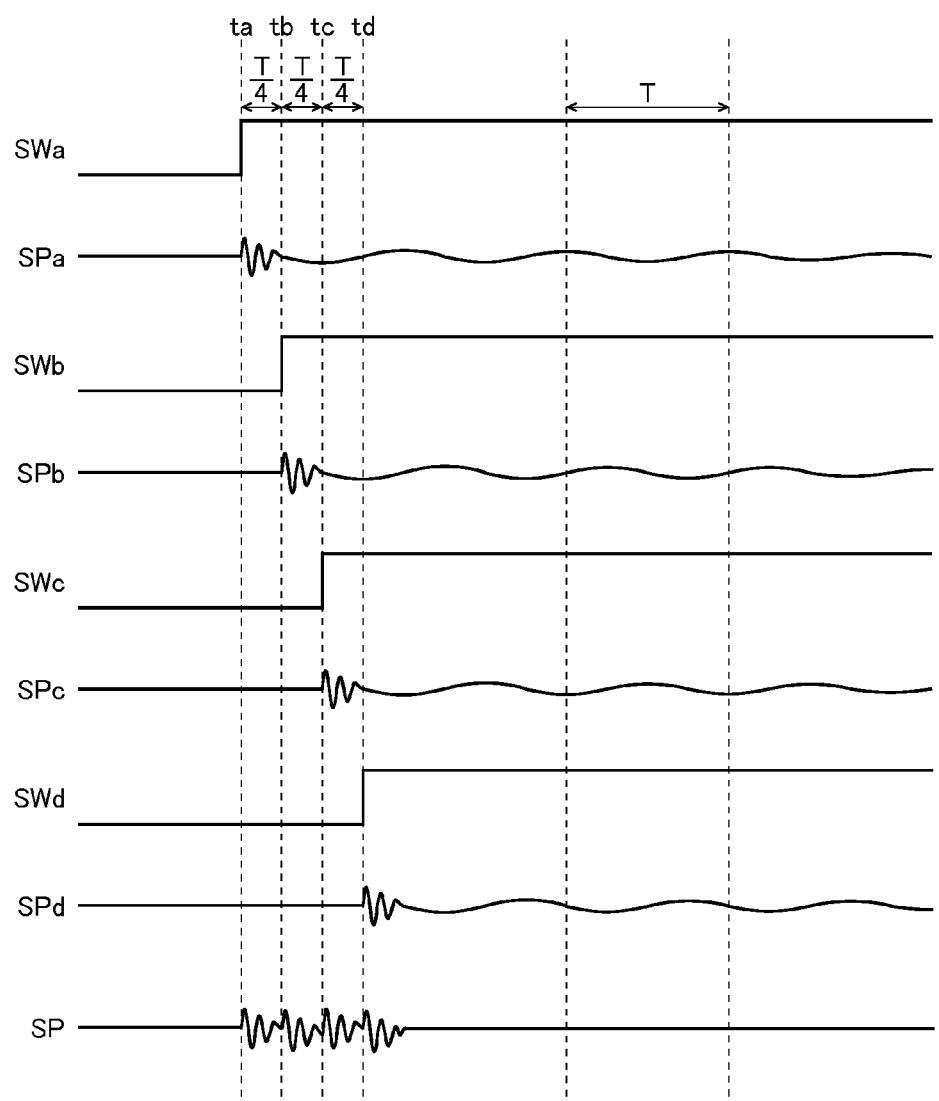
FIG. 3 is a time chart illustrating a modified example of the noise removal operation.

FIG. 3 is a time chart illustrating a modified example of the noise removal operation, exemplifying a case where four transistors are connected in parallel. In this case, four transistors 11a to 11d are turned on by shifting the phases by T/4 each from the time point ta to a time point td. As a result, the noise SPa generated due to the turn-on operation of the transistor 11a and a noise SPc generated due to the turn-on operation of a transistor 11c are canceled by each other. In addition, the noise SPb generated due to the turn-on operation of the transistor 11b and a noise SPd generated due to the turn-on operation of the transistor 11d are canceled by each other.

In addition, because the four transistors 11a to 11d have an element size obtained by dividing the single transistor 232 (see FIG. 14) having desired impedance characteristics into ¼, it is possible to suppress the noises SPa to SPd to be smaller.

Second Embodiment

Figure 4:
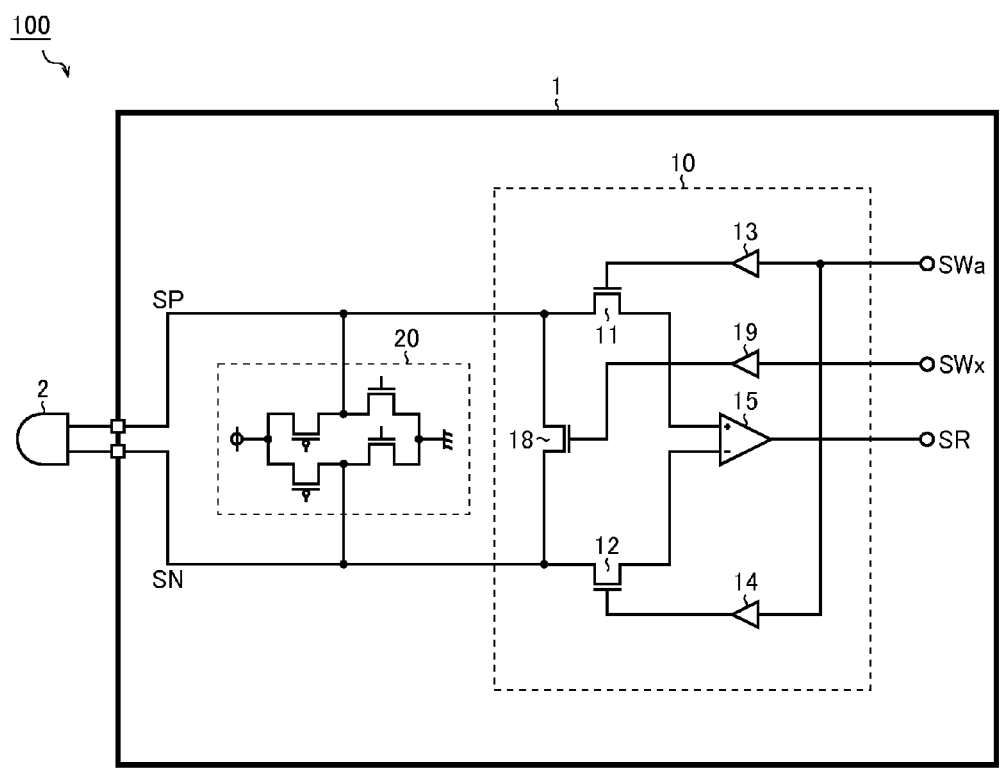
FIG. 4 is a diagram illustrating a second embodiment of the sensor device.

FIG. 4 is a diagram illustrating a second embodiment of the sensor device for sending and receiving ultrasonic waves. A basic structure of the second embodiment is the same as the first embodiment described above. The receiving circuit 10 of the second embodiment has a following feature. As a technique for suppressing noise generated in switching to the reception operation, instead of a structure in which each of transistors 11 and 12 is divided into a plurality of transistors, a switch (N-channel MOS field effect transistor) 18 is disposed for forming a short circuit of the positive phase transmission path of the reception signal. SP and the reverse phase transmission path of the reception signal SN when switching to the reception operation based on a control signal SWx input through a buffer 19. Therefore, in the following description of the second embodiment, overlapping description of the same structural elements as the first embodiment is omitted, while operation, action and effect of the switch 18 are mainly described.

Figure 5:
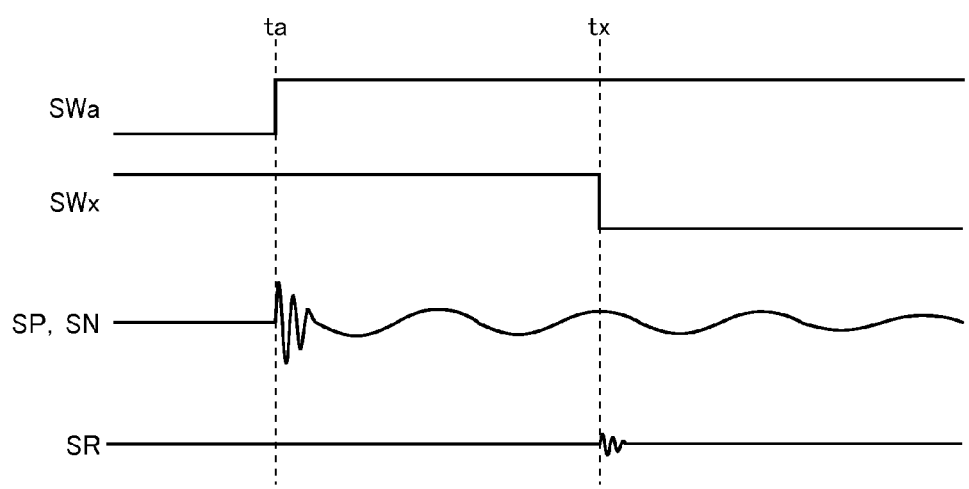
FIG. 5 is a time chart illustrating a noise removal operation of the second embodiment.

FIG. 5 is a time chart illustrating a noise removal operation of the second embodiment, in which the control signal SWa, the control signal SWx, the reception signals SP and SN, and the differential amplified signal SR are illustrated in order from an upper side.

When the control signal SWa is raised from low level to high level at the time point ta, the transistors 11 and 12 are turned on. Then, noise having a resonance period T of the piezoelectric sensor 2 is generated in the reception signals SP and SN. However, the control signal SWx is high level at the time point ta so that the switch 18 is turned on. In other words, at the timing when the noise is generated due to the turn-on operation of the transistors 11 and 12 (time point ta), the positive phase transmission path of the reception signal SP and the reverse phase transmission path of the reception signal SN are short-circuited to each other. Therefore, noises respectively superimposed on the reception signals SP and SN have basically the same phase.

With this structure, noises superimposed on the reception signals SP and SN are appropriately canceled by each other by the differential amplification process in the differential amplifier 15. Therefore, it is possible to transmit the differential amplified signal SR with little noise to the control circuit 30, and hence to largely suppress the noise generated in switching to the reception operation. Thus, it is possible to shorten the reception wait time and to increase detection accuracy of the ultrasonic wave.

Note that the control signal SWx is dropped from high level to low level at a time point tx after a predetermined time from the time point ta. Therefore, after the time point tx, the switch 18 is turned off, and the connection between the positive phase transmission path of the reception signal SP and the reverse phase transmission path of the reception signal SN is disconnected. Thus, it is possible to receive the ultrasonic wave.

Third Embodiment

Figure 6:
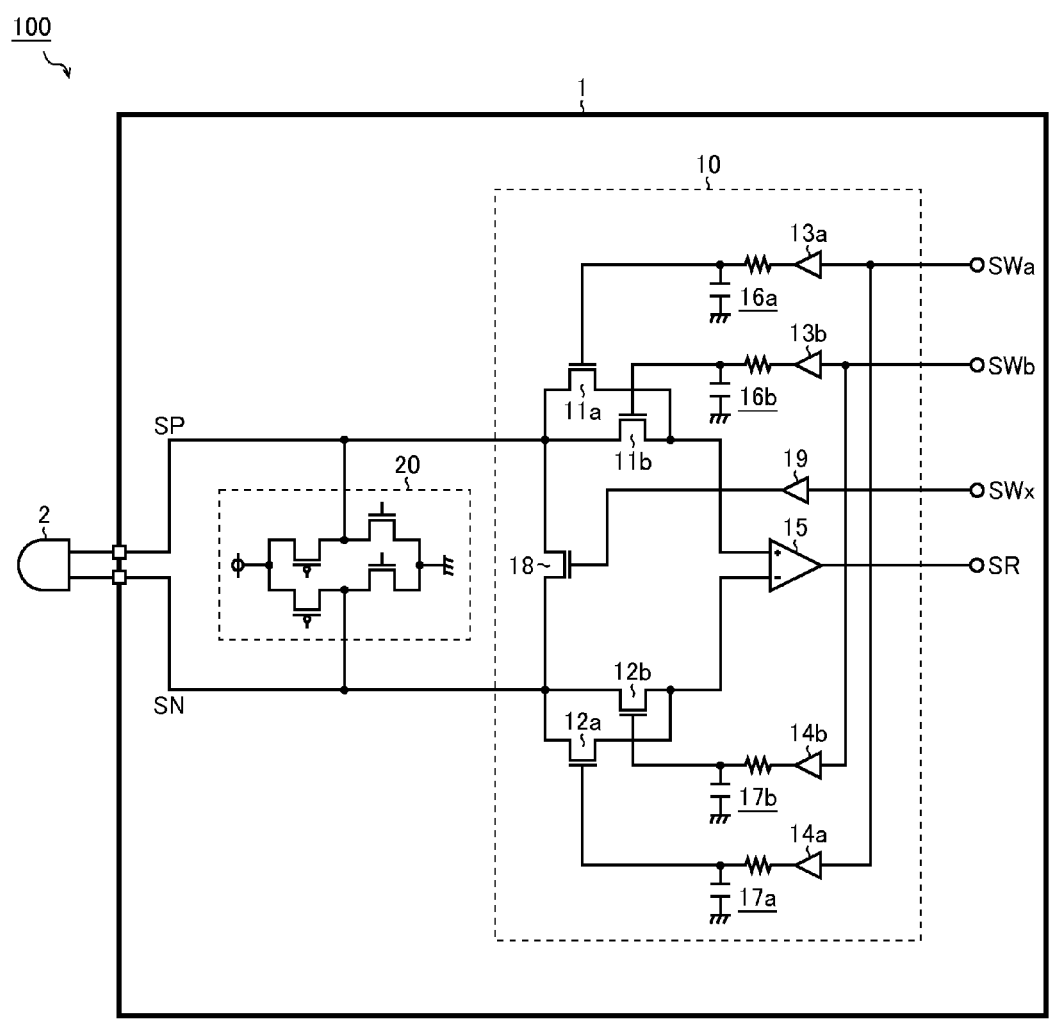
FIG. 6 is a diagram illustrating a third embodiment of the sensor device.

FIG. 6 is a diagram illustrating a third embodiment of the sensor device. As illustrated in FIG. 6, the third embodiment has a structure in which the first embodiment and the second embodiment are combined.

Figure 7:
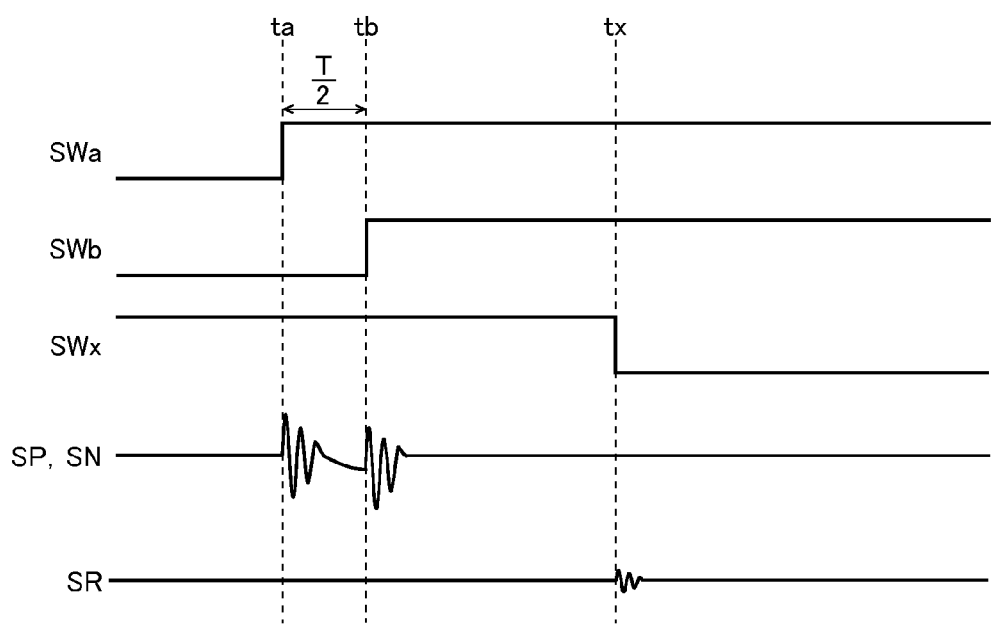
FIG. 7 is a time chart illustrating the noise removal operation of the third embodiment.

FIG. 7 is a time chart illustrating a noise removal operation of the third embodiment, in which the control signal SWa, the control signal SWb, the control signal SWx, the reception signals SP and SN, and the differential amplified signal SR are illustrated from an upper side.

First, when the control signal SWa is raised from low level to high level at the time point ta, the transistors 11a and 12a are turned on. Next, when the control signal SWb is raised from low level to high level at the time point tb after T/2 from the time point ta, the transistors 11b and 12b are turned on. By this switching control, it is possible to disperse or cancel noises due to the turn-on operation of the transistor without deteriorating impedance characteristics of the transistor for connecting/disconnecting between the piezoelectric sensor 2 and the differential amplifier 15. This point is already described in the first embodiment.

In addition, at the time point ta and the time point tb, the control signal SWx is in high level so that the switch 18 is turned on. By this switching control, noises superimposed respectively on the reception signals SP and SN can be the same phase so that the canceling effect by the differential amplification process can be enhanced. Therefore, the differential amplified signal SR with little noise can be transmitted to the control circuit 30. This point is already described in the second embodiment.

Note that the control signal SWx is dropped from high level to low level at the time point tx after a predetermined time from the time point tb. Therefore, after the time point tx, the switch 18 is turned off, and hence the connection between the positive phase transmission path of the reception signal SP and the reverse phase transmission path of the reception signal SN is disconnected. Therefore, it is possible to receive the ultrasonic wave. This point is already described in the second embodiment, too.

In this way, in the third embodiment, by combining the first embodiment with the second embodiment, it is possible to largely suppress the noise generated in switching to the reception operation, so as to shorten the reception wait time and to improve detection accuracy of the ultrasonic wave.

Fourth Embodiment

Figure 8:
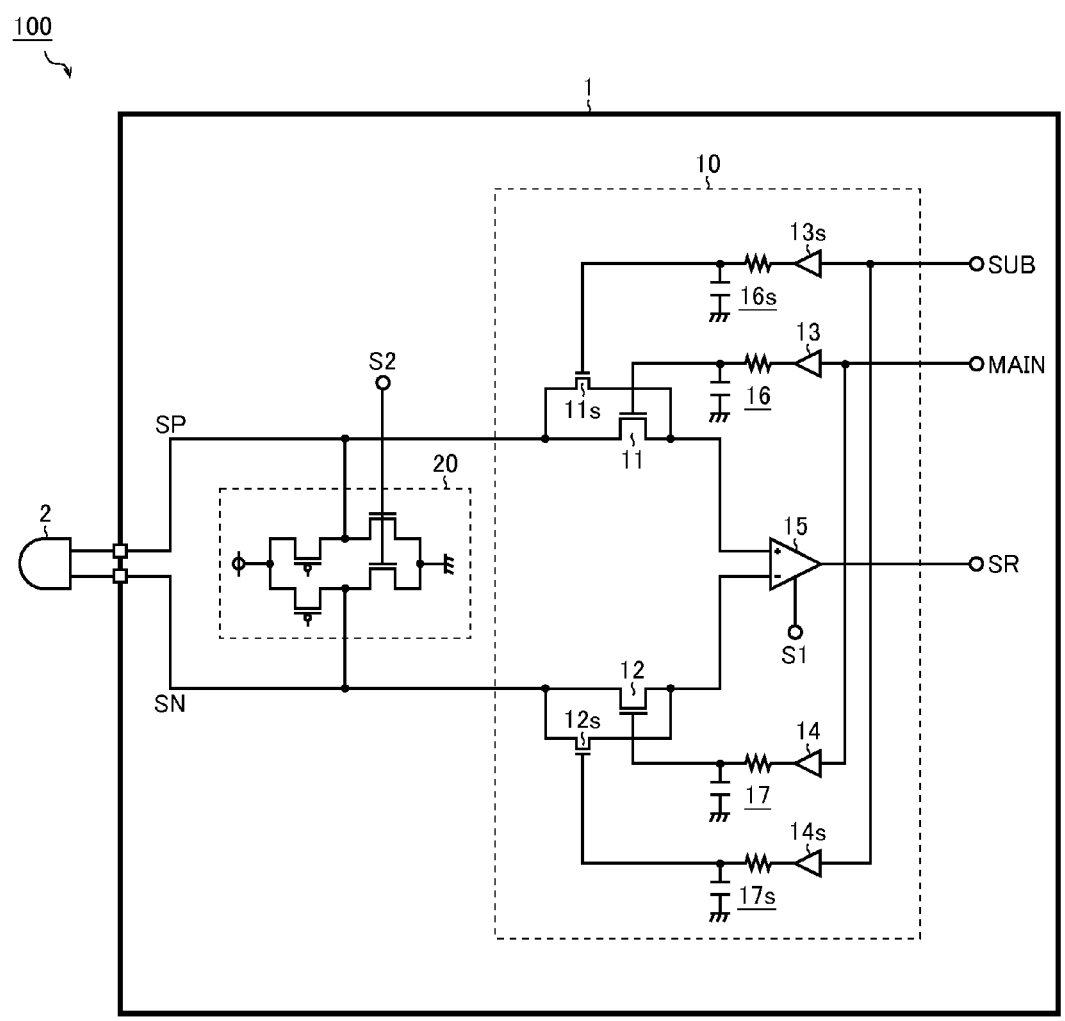
FIG. 8 is a diagram illustrating a fourth embodiment of the sensor device.

FIG. 8 is a diagram illustrating a fourth embodiment of the sensor device for sending and receiving ultrasonic waves. A basic structure of the fourth embodiment is the same as the first embodiment described above. The receiving circuit 10 of the fourth embodiment has a following feature. As a technique for suppressing noise generated in switching to the reception operation, instead of a structure in which each of the main transistors 11 and 12 (having an on-impedance of a few n) is divided into a plurality of transistors, sub transistors 11s and 12s (having an on-impedance of a few kΩ) are disposed in parallel to the main transistors 11 and 12, and the sub transistors 11s and 12s are turned on prior to the main transistors 11 and 12 in switching to the reception operation. Therefore, in the following description of the fourth embodiment, overlapping description of the same structural elements as the first embodiment is omitted, while operation, action and effect of the sub transistors 11s and 12s are mainly described.

The receiving circuit 10 is a circuit block for receiving reception signals SP and SN differentially input from the piezoelectric sensor 2 in reception operation of the ultrasonic wave so as to transmit to the control circuit 30 (not shown in FIG. 8). The receiving circuit 10 includes the main transistors 11 and 12, buffers 13 and 14, the differential amplifier 15, and filters 16 and 17. The receiving circuit 10 further includes the sub transistors 11s and 12s, buffers 13s and 14s, and filters 16s and 17s.

Drains of the main transistor 11 and the sub transistor 11s are both connected to the positive phase input/output terminal of the piezoelectric sensor 2. Sources of the main transistor 11 and the sub transistor 11s are both connected to the positive phase input terminal of the differential amplifier 15. A gate of the main transistor 11 is connected to an application terminal of a control signal MAIN via the filter 16 and the buffer 13. A gate of the sub transistor 11s is connected to the application terminal of a control signal SUB via the filter 16s and the buffer 13s. Note that the sub transistor 11s is designed to have a larger on-impedance than the main transistor 11.

Drains of the main transistor 12 and the sub transistor 12s are both connected to the reverse phase input/output terminal of the piezoelectric sensor 2. Sources of the main transistor 12 and the sub transistor 12s are both connected to the reverse phase input terminal of the differential amplifier 15. A gate of the main transistor 12 is connected to an application terminal of the control signal MAIN via the filter 17 and the buffer 14. A gate of the sub transistor 12s is connected to an application terminal of the control signal SUB via the filter 17s and the buffer 14s. Note that the sub transistor 12s is designed to have a larger on-impedance than the main transistor 12.

The buffers 13 and 13s shape waveforms of the control signals MAIN and SUB so as to transmit to the filters 16 and 16s, respectively.

The buffers 14 and 14s shape waveforms of the control signals MAIN and SUB so as to transmit to the filters 17 and 17s, respectively.

The differential amplifier 15 differentially amplifies the reception signals SP and SN of the piezoelectric sensor 2 so as to generate the differential amplified signal SR, and sends out the differential amplified signal SR to the control circuit 30. Note that the differential amplifier 15 becomes an enabled state (drive state) when a control signal S1 is in high level and becomes disabled state (non-drive state) when the control signal S1 is in low level.

The filters 16 and 16s respectively blunt the control signals MAIN and SUB so as to transmit to gates of the main transistor 11 and the sub transistor 11s. As the filters 16 and 16s, a CR low-pass filter including a resistor and a capacitor can be used, for example.

The filters 17 and 17s respectively blunt the control signals MAIN and SUB so as to transmit to gates of the main transistor 12 and the sub transistor 12s. As the filters 17 and 17s, a CR low-pass filter including a resistor and a capacitor can be used, for example.

The transmission circuit 20 differentially outputs transmission signal (rectangular pulse) to the piezoelectric sensor 2 in transmission operation of the ultrasonic wave. Note that the transmission circuit 20 has a function of making both the positive phase input terminal and the reverse phase input/output terminal of the piezoelectric sensor 2 short-circuited to GND when a control signal S2 is in high level, and releasing the short circuit to the GND when the control signal S2 is in low level.

Figure 9:
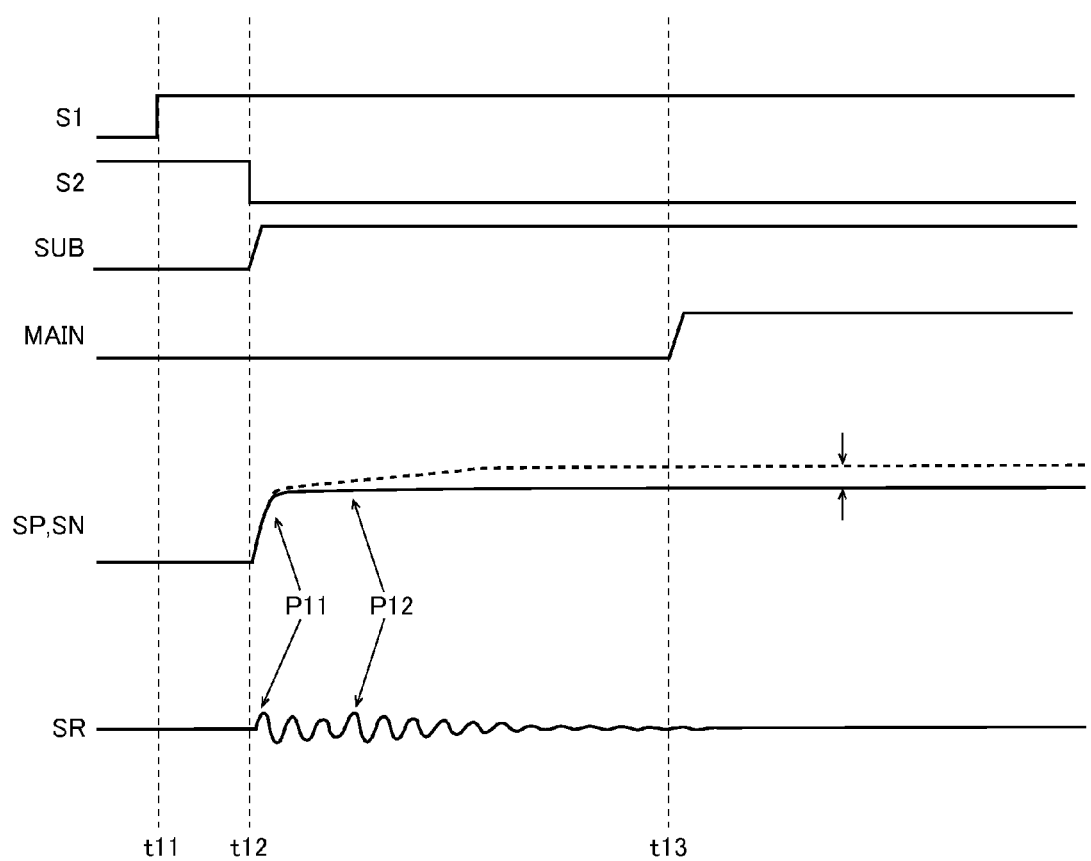
FIG. 9 is a time chart illustrating the noise removal operation of the fourth embodiment.
Figure 10:
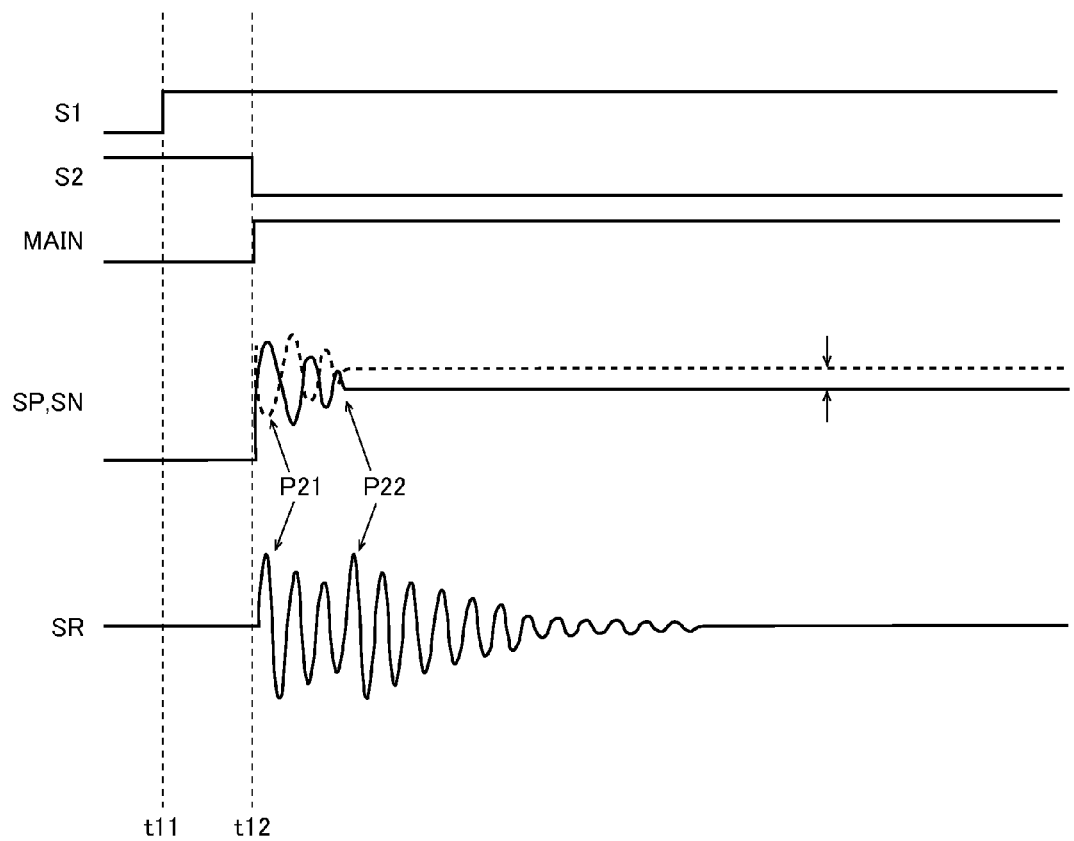
FIG. 10 is a time chart in a case without a sub transistor.

FIG. 9 is a time chart illustrating a noise removal operation of the fourth embodiment, in which the control signal S1, the control signal S2, the control signal SUB, the control signal MAIN, the reception signals SP and SN (solid line and broken line), and the differential amplified signal SR are illustrated in order from an upper side. In addition, FIG. 10 illustrates a time chart in a case without the sub transistors 11s and 12s for comparison.

As illustrated in FIG. 9, when reception of the ultrasonic wave by the sensor device 100 of the fourth embodiment is started, the control signal S1 is raised from low level to high level at a time point t11, and afterward the control signal S2 is dropped from high level to low level at a time point t12. In other words, after the differential amplifier 15 is enabled at the time point t11, the short circuit to the GND of the piezoelectric sensor 2 is released at the time point t12.

In addition, at the time point t12, the control signal SUB is raised from low level to high level while the control signal MAIN is maintained at low level. In other words, at the time point t12, the sub transistors 11s and 12s are turned on while the main transistors 11 and 12 remain to be off. However, the on timing of the sub transistors 11s and 12s is not limited to this and may be set to an arbitrary timing as long as it is prior to the on timing of the main transistors 11 and 12 (for example, prior to the time point t11).

After that, at a time point t13, the control signal MAIN is raised from low level to high level. In other words, at the time point t13, the main transistors 11 and 12 are also turned on together with the sub transistors 11s and 12s.

In this way, the sequence in which the sub transistors 11s and 12s having a resistance of a few kΩ are turned on prior to the main transistors 11 and 12 having a resistance of a few Ω can soften the application of a circuit bias voltage to the piezoelectric sensor 2. Therefore, it is possible to suppress generation of noise due to resonance of the piezoelectric sensor 2 (compare P11 in FIG. 9 with P21 in FIG. 10).

In addition, according to the sequence described above, a voltage difference between the reception signal SP and the reception signal SN increases with a mild slope up to an input offset voltage of the differential amplifier 15. Therefore, it is also possible to suppress generation of the noise due to the input offset voltage of the differential amplifier 15 (compare P12 in FIG. 9 with P22 in FIG. 10).

In addition, by blunting the control signals MAIN and SUB, it is also possible to suppress generation itself of the noise described above.

In this way, the sensor device 100 of the fourth embodiment can largely suppress the noise generated in switching to the reception operation, and hence it is possible to shorten the reception wait time and to improve detection accuracy of the ultrasonic wave.

Though not illustrated again, it is possible to arbitrarily combine the first to third embodiments with the fourth embodiment.

Fifth Embodiment

Figure 11:
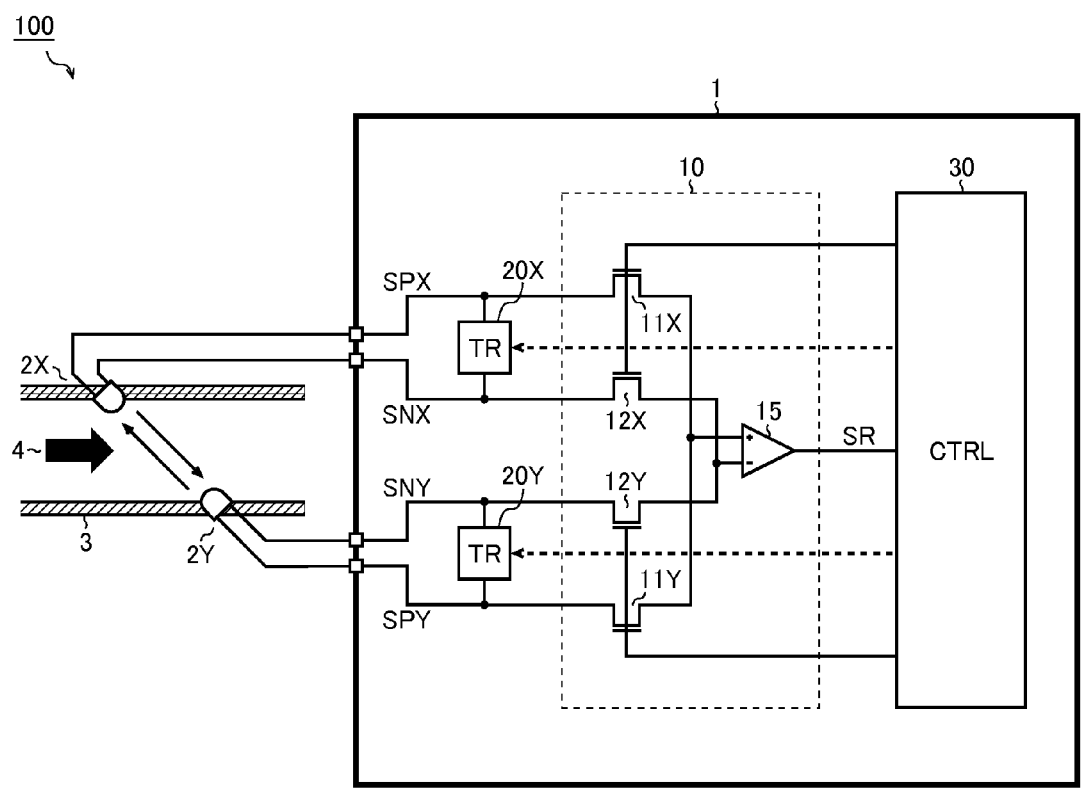
FIG. 11 is a diagram illustrating a fifth embodiment of the sensor device (application as a current meter).

FIG. 11 is a diagram illustrating a fifth embodiment of the sensor device. The fifth embodiment is an example of an application of using the sensor device 100 as a current meter for measuring a flow speed V of fluid 4 flowing in a pipe 3.

Figure 12:
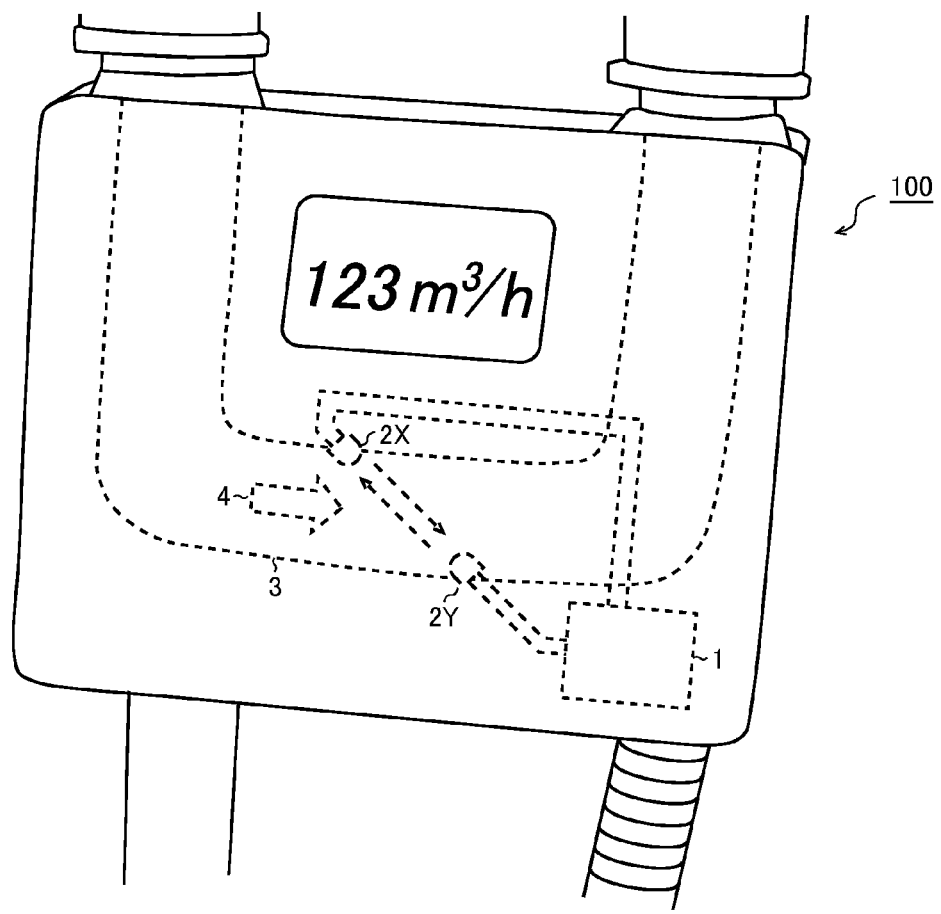
FIG. 12 is an external view of the sensor device (current meter).

The sensor device 100 of the fifth embodiment includes the semiconductor device 1 and two piezoelectric sensors 2X and 2Y. The piezoelectric sensors 2X and 2Y are disposed on an inner wall surface of the pipe 3 in such a manner to be opposed to each other with a predetermined angle to the fluid 4. FIG. 12 is an external view of the sensor device 100 (current meter).

The receiving circuit 10, transmission circuits 20X and 20Y, and the control circuit 30 are integrated in the semiconductor device 1. The receiving circuit 10 includes a differential amplifier 15, transistors 11X and 12X for connecting/disconnecting between the piezoelectric sensor 2X and the differential amplifier 15, and transistors 11Y and 12Y for connecting/disconnecting between the piezoelectric sensor 2Y and the differential amplifier 15. In this way, in the receiving circuit 10 of the fifth embodiment, the transmission circuits 20X and 20Y are disposed for the piezoelectric sensors 2X and 2Y, respectively, and the single receiving circuit 10 is disposed for the piezoelectric sensors 2X and 2Y. With this structure, without unnecessarily increasing a circuit scale of the semiconductor device 1, a chip area thereof can be reduced. In addition, in a structure in which the receiving circuit 10 is disposed for each of the piezoelectric sensors 2X and 2Y (in other words, differential amplifiers 15X and 15Y are disposed for the piezoelectric sensors 2X and 2Y, respectively), a measurement error of propagation time may occur due to variation of the differential amplifiers 15X and 15Y. In contrast, in the structure in which the receiving circuit 10 is disposed solely for the piezoelectric sensors 2X and 2Y, such a measurement error does not occur, and hence the flow speed V can be measured with high accuracy.

When the noise suppression technique of the first embodiment is applied to the receiving circuit 10 of a fifth embodiment, the transistors 11X and 12X, as well as the transistors 11Y and 12Y are respectively divided into a plurality of transistors. In addition, when the noise suppression technique of the second embodiment is applied, there are disposed a switch for connecting/disconnecting between signal paths through which reception signals SPX and SNX of the piezoelectric sensor 2X are respectively transmitted, and a switch for connecting/disconnecting between signal paths through which reception signals SPY and SNY of the piezoelectric sensor 2Y are respectively transmitted. Similarly, when the noise suppression technique of the third embodiment is applied, the transistors 11X and 12X, as well as the transistors 11Y and 12Y are respectively divided into a plurality of transistors. Then, there are disposed a switch for connecting/disconnecting between signal paths through which the reception signals SPX and SNX of the piezoelectric sensor 2X are respectively transmitted, and a switch for connecting/disconnecting between signal paths through which the reception signals SPY and SNY of the piezoelectric sensor 2Y are respectively transmitted. In addition, when the noise suppression technique of the fourth embodiment is applied, a transistor (a few kΩ) is connected in parallel to the transistors 11X and 12X, and to the transistors 11Y and 12Y corresponding to the main transistors (a few Ω). In this way, by appropriately applying the noise suppression technique of the first to fourth embodiments, noise generated in switching to the reception operation can be largely suppressed, and hence it is possible to shorten the reception wait time and to improve detection accuracy of the ultrasonic wave.

In addition, it is preferred to design a plurality of signal paths respectively connecting the piezoelectric sensors 2X and 2Y to the receiving circuit 10 to have the same length. With this structure, a propagation time measurement error of the ultrasonic wave due to a signal path length difference can be eliminated so that the flow speed V of the fluid 4 can be measured with high accuracy.

Figure 13:
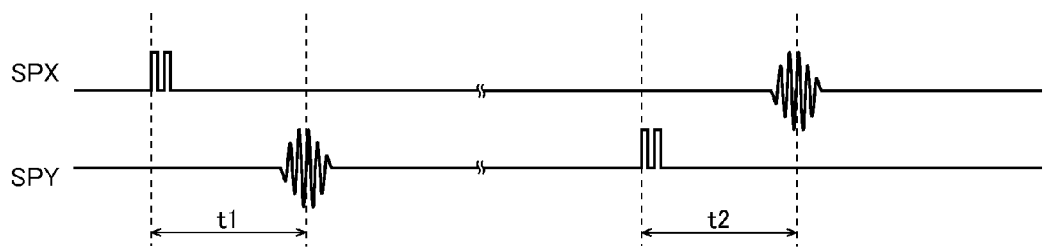
FIG. 13 is a time chart for explaining flow speed measurement operation.

FIG. 13 is a time chart for describing a flow speed measurement operation, in which the transmission/reception signal SPX of the piezoelectric sensor 2X and the transmission/reception signal SPY of the piezoelectric sensor 2Y are illustrated. Note that only the transmission/reception signals SPX and SPY on the positive phase side are illustrated in FIG. 13, but the reception signals SNX and SNY on the reverse phase side also show the same behavior as the signals on the positive phase side except that the phase is reversed by 180 degrees.

When the flow speed V of the fluid 4 is measured, in the first place, the piezoelectric sensor 2X is set to the transmission side (SPX is the transmission signal), and the piezoelectric sensor 2Y is set to the reception side (SPY is the reception signal), so that propagation time t1 of the ultrasonic wave is measured. Next, on the contrary, the piezoelectric sensor 2Y is set to the transmission side (SPY is the transmission signal), and the piezoelectric sensor 2X is set to the reception side (SPX is the reception signal), so that propagation time t2 of the ultrasonic wave is measured. Then, the flow speed V of the fluid 4 is calculated from a difference (t2−t1) between the propagation time t1 and the propagation time t2. For instance, when the piezoelectric sensor 2X is directed in a forward direction to the fluid 4, while the piezoelectric sensor 2Y is directed in an opposite direction to the fluid 4, the propagation time t1 becomes shorter while the propagation time t2 becomes longer as the flow speed V of the fluid 4 becomes larger. In other words, it is understood that the flow speed V is larger as the difference (t2−t1) is larger.

Other Modified Examples

In the embodiments described above, the structure in which the present invention is applied to the sensor device for sending and receiving ultrasonic waves is exemplified for detailed description. However, application of the present invention is not limited to this. The present invention can also be applied to a sensor device for only receiving ultrasonic waves, which includes a transistor for connecting/disconnecting a signal path from a piezoelectric sensor to an amplifier (which turns on the transistor in reception operation of the ultrasonic wave).

In addition, in the embodiment described above, a structure in which the reception signal is transmitted between the piezoelectric sensor and the amplifier in a differential form is exemplified for description. However, the present invention is not limited to this, and it is possible to adopt a structure in which the reception signal is transmitted between the piezoelectric sensor and the amplifier in a single form in the first embodiment (in which the main transistor is divided and connected in parallel) and the fourth embodiment (in which the sub transistor is added).

In this way, various technical features disclosed in this specification can be variously modified within a range that does not deviate from the gist of the technical creation other than the embodiments described above. For instance, it is arbitrary to mutually replace between a bipolar transistor and a MOS field effect transistor or to invert logical levels of various signals. In other words, the embodiments described above are examples in all respects and should not be interpreted as limitations. The technical scope of the present invention is defined not by the description of the embodiments but by the claims, and should be understood to include all modifications belonging to the meanings and the scope equivalent to the claims.

INDUSTRIAL APPLICABILITY

The present invention can be applied to all sensor devices using a piezoelectric sensor (for example, a current meter or a vehicle sonar).

EXPLANATION OF NUMERALS 1 semiconductor device
2, 2X, 2Y sensor
3 pipe
4 fluid
10 receiving circuit
11 N-channel MOS field effect transistor (main transistor)
11a, 11b, 11X, 11Y N-channel MOS field effect transistor
11s N-channel MOS field effect transistor (sub transistor)
12 N-channel MOS field effect transistor (main transistor)
12a, 12b, 12X, 12Y N-channel MOS field effect transistor
12s N-channel MOS field effect transistor (sub transistor)
13, 13a, 13b, 13s, 14, 14a, 14b, 14s buffer
15 differential amplifier
16, 16a, 16b, 16s, 17, 17a, 17b, 17s filter
18 switch (N-channel MOS field effect transistor)
19 buffer
20, 20X, 20Y transmission circuit
30 control circuit
100 sensor device (current meter)

The invention claimed is:

1. A receiving circuit comprising:
an amplifier for amplifying a reception signal of a piezoelectric sensor; and
a plurality of transistors connected in parallel between one end of the piezoelectric sensor and one end of the amplifier, the transistors being turned on with phase shift in switching to a reception operation.

2. The receiving circuit according to claim 1, wherein the plurality of transistors are 2n transistors obtained by dividing a single transistor having desired impedance characteristics into ½n (n is a natural number).

3. The receiving circuit according to claim 2, wherein the 2n transistors are turned on with phases shifted by T/2n each (T is a resonance period of the piezoelectric sensor) in switching to the reception operation.

4. The receiving circuit according to claim 1, further comprising a filter for blunting a control signal of each transistor.

5. The receiving circuit according to claim 1, wherein the reception signal is transmitted between the piezoelectric sensor and the amplifier in a differential form.

6. The receiving circuit according to claim 5, further comprising a switch for short-circuiting a positive phase transmission path and a reverse phase transmission path of the reception signal in switching to the reception operation.

7. A receiving circuit comprising:
an amplifier for differentially amplifying a reception signal of a piezoelectric sensor;
a first transistor for connecting between the piezoelectric sensor and the amplifier in switching to a reception operation; and
a second transistor for short-circuiting a positive phase transmission path and a reverse phase transmission path of the reception signal in switching to the reception operation.

8. A receiving circuit comprising:
an amplifier for amplifying a reception signal of the piezoelectric sensor;
a main transistor connected between one end of the piezoelectric sensor and one end of the amplifier, the main transistor being turned on in switching to a reception operation; and
a sub transistor connected in parallel to the main transistor, the sub transistor having a larger on-impedance than the main transistor and being turned on prior to the main transistor in switching to the reception operation.

9. The receiving circuit according to claim 8, the main transistor is divided into 2n transistors to be turned on with phases shifted by T/2n each (T is a resonance period of the piezoelectric sensor, and n is a natural number) in switching to the reception operation.

10. The receiving circuit according to claim 8, further comprising a filter for blunting control signals of the main transistor and the sub transistor.

11. The receiving circuit according to claim 8, wherein the reception signal is transmitted between the piezoelectric sensor and the amplifier in a differential form.

12. The receiving circuit according to claim 11, further comprising a switch for short-circuiting a positive phase transmission path and a reverse phase transmission path of the reception signal in switching to the reception operation.

13. A semiconductor device, comprising the receiving circuit according to claim 1, to which the reception signal is input from the piezoelectric sensor.

14. The semiconductor device according to claim 13, further comprising:
a transmission circuit configured to output a transmission signal to the piezoelectric sensor; and
a control circuit configured to control the reception operation of the receiving circuit and the transmission operation of the transmission circuit in a time sharing manner.

15. The semiconductor device according to claim 14, wherein
the transmission circuit is disposed for each one of a plurality of piezoelectric sensors, and
the receiving circuit is disposed solely for the plurality of piezoelectric sensors.

16. The semiconductor device according to claim 11, wherein a plurality of signal paths respectively connecting between the receiving circuit and the plurality of piezoelectric sensors are designed to have the same length.

17. A sensor device comprising a piezoelectric sensor and the semiconductor device according to claim 13.

18. The sensor device according to claim 17, wherein the sensor device is a current meter for measuring flow speed of a fluid flowing in a pipe.

19. The sensor device according to claim 18, wherein the piezoelectric sensor includes a first piezoelectric sensor and a second piezoelectric sensor disposed on an inner wall surface of the pipe in such a manner to be opposed to each other with a predetermined angle to the fluid.

20. The receiving circuit according to claim 9, further comprising a filter for blunting control signals of the main transistor and the sub transistor.

* * * * *